United States Patent [19]

Gattiker

[11] 4,201,280
[45] May 6, 1980

[54] CLUTCH-BRAKE UNIT FOR THE MAIN SHAFT OF A LOOM

[75] Inventor: Ernst Gattiker, Arbon, Switzerland

[73] Assignee: Adolph Saurer Limited, Arbon, Switzerland

[21] Appl. No.: 901,076

[22] Filed: Apr. 28, 1978

[51] Int. Cl.² ............................................ F16D 11/06
[52] U.S. Cl. .................................... 192/18 A; 139/1 E
[58] Field of Search ..................... 139/1 E; 192/18 A; 188/170

[56] References Cited

U.S. PATENT DOCUMENTS

| | | | |
|---|---|---|---|
| 2,600,667 | 6/1952 | Mason | 139/1 E |
| 3,770,085 | 11/1973 | Cottingham | 192/18 A |
| 3,805,849 | 4/1974 | Steverlynck | 139/1 E |
| 3,970,176 | 7/1976 | Bucksch | 192/18 A |
| 4,071,940 | 2/1978 | Hazelton | 192/18 A |

*Primary Examiner*—Henry Jaudon
*Attorney, Agent, or Firm*—Bailey, Dority & Flint

[57] ABSTRACT

The invention refers to a brake for the main shaft of a loom in which in the transmission of the energy between the driving motor and the main shaft a disconnectable friction coupling controlled by supervisory members for the weaving process is interposed, which has a slidable pressure-piece which in one extreme position, with the weaving process in order, preserves frictional engagement between the main shaft and the driving motor and which in the other extreme position, in the case of disturbances in the weaving process, produces frictional engagement between the main shaft and a brake rigidly connected to the machine frame.

5 Claims, 1 Drawing Figure

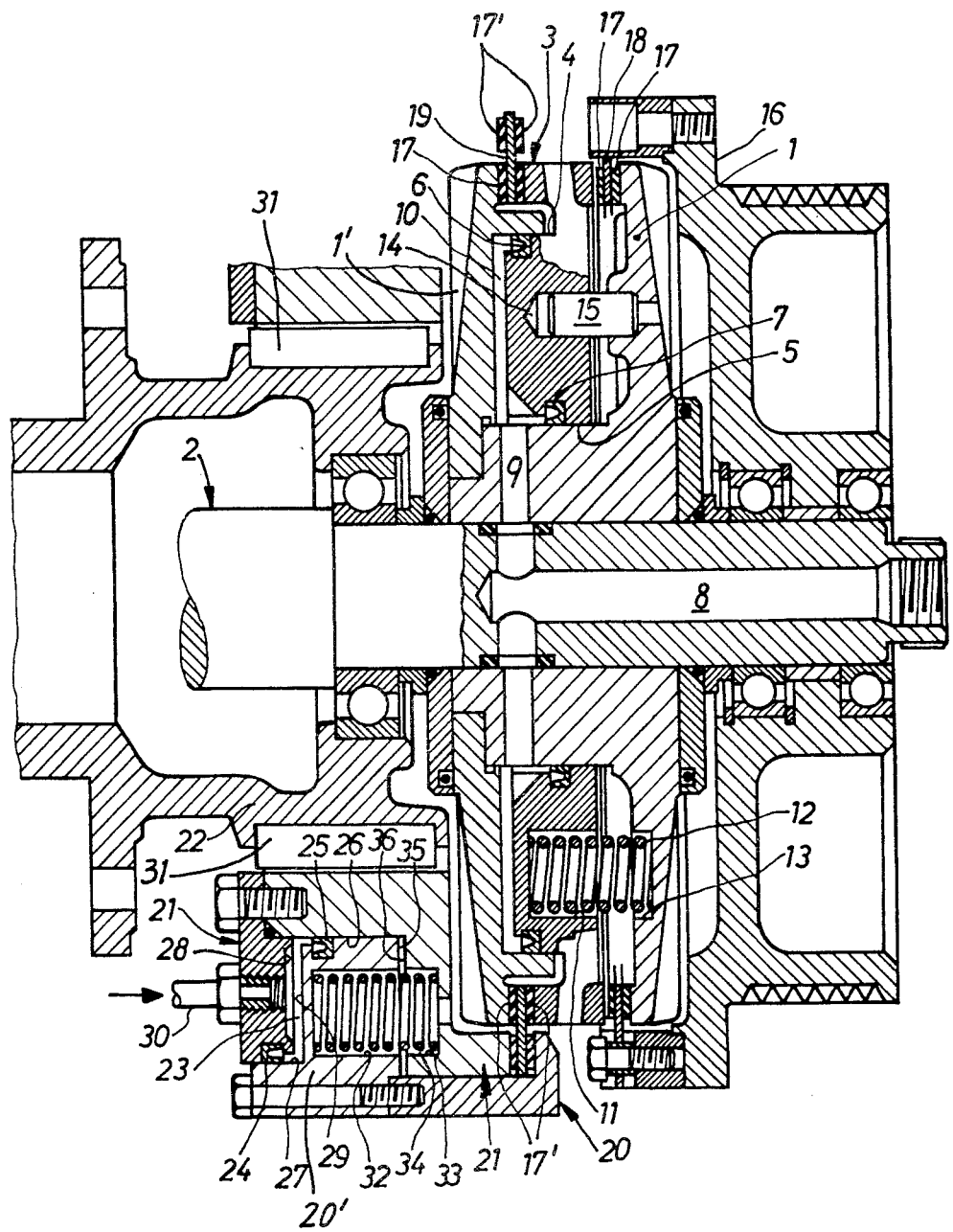

CLUTCH-BRAKE UNIT FOR THE MAIN SHAFT OF A LOOM

BACKGROUND OF THE INVENTION

The problem exists with prior brakes of allowing the main shaft to turn slowly forwards and backwards for elimination of the trouble which has triggered the braking. This is difficult because the sliding travel of the pressure-piece between its two extreme positions is dimensioned very closely in order to be able to start the braking as fast as possible without delay, that is, often so closely that simultaneous touching by the friction surfaces of the drive coupling counterpart and of the brake stator is not always excluded with certainty. However, rubbing of the pressure-piece on the brake stator results in energy loss, heating and wear.

In practice, the pressure-piece is moved alternately and briefly with light pressure between its two extreme positions, which causes a jerky turning and stopping of the main shaft. But this method is not satisfactory since on the one hand the power requirement of the loom around one revolution of the main shaft is variable, so that the turning and stopping motion becomes uncontrollabe, and on the other hand the alternating contact of the pressure-piece with the friction surfaces, accompanied by slip, brings about heating and wear.

The invention has in view the elimination of these disadvantages. It consists in the brake being made releasable without alteration of the position of the pressure-piece. In other words, the friction surfaces of the brake are connected releasably to their mounting so that release can be effected under control.

SUMMARY OF THE INVENTION

In accordance with an advantageous refinement of the invention the brake may comprise, separate from the pressure piece, a brake disk which in the other extreme position of the pressure-piece is clamped firmly onto the main shaft and affords regions against which a clamping mechanism on the brake may engage releasably.

BRIEF DESCRIPTION OF THE DRAWING

The construction designed to carry out the invention will be hereinafter described, together with other features thereof.

The invention will be more readily understood from a reading of the following specification and by reference to the accompanying drawing forming a part thereof, wherein an example of the invention is shown and wherein:

The FIGURE illustrates a brake mechanism together with a coupling and a drive pulley in longitudinal section.

The invention is explained below in greater detail with further particulars with the aid of a drawing of an embodiment.

DESCRIPTION OF A PREFERRED EMBODIMENT

A coupling housing comprising two flange portions 1 and 1" which is seated fixedly against rotation on the main shaft 2 of a loom receives a pressure-piece 3 to be axially slidable. This pressure-piece 3 is made as an annular piston the inner and outer running surfaces of which, 4 and 5 respectively, are guided via sealing rings 6 and 7 along cylindrical running surfaces of the coupling housing flange portions 1 and 1'.

The main shaft 2 exhibits an axial bore 8 which communicates via radial bores 9 with a pressure chamber 10 which is enclosed by the sealed running surfaces of the coupling housing flange portions and the endfaces of the coupling housing flange portion 1' and the pressure-piece 3 lying radially between them. In the endface of the pressure-piece 3, which is remote from the pressure chamber 10, bores 11 are formed, which receive compression springs 12. The other end of the compression springs 12 are guided in counterbores 13 in the coupling housing flange portion 1 and bear against the bottom of them.

Further bores 14 in the same endface of the pressure-piece 3 receive guidepins 15 which are fastened into the coupling housing flange portion 1 and bring about locking in rotation between the pressure-piece and the coupling housing flange portion 1.

On the main shaft 2 a belt pulley 16 is supported to be able to rotate, which carries a driving disk 18 coated on both sides with brake linings 17, which penetrates into the gap on the compression-spring side between the pressure-piece 3 and the endface of the coupling housing flange portion 1.

A brake disk 19 projects inwards into the gap between the pressure-piece 3 and the coupling housing flange portion 1' and is coated on both sides with brake linings 17'. The disk projects outwards from the periphery of the coupling housing and radially outside of it. It being understood that the brake linings may be coated or bonded to the various driving and brake disks in any suitably conventional manner.

A brake is provided by the brake disk 19 which projects by these outer brake linings 17' between the opposing radial surfaces of two clamping cheeks 20 and 21 respectively, which are axially slidable with respect to one another. The radially inner clamping cheek 21 is carried by a cylindrical extension 22 of the machine frame to be axially slidable and fixed against rotation by means of longitudinal keys 31 and includes a cylindrical running surface 26. A cover 21' is screwed on the external flat face of the clamping cheek 21. The radially outer clamping cheek 20 is provided with an annular piston 20' screwed thereto which provides outer running surfaces 26 and 27. The running surfaces 26 and 27 glide over sealing rings 24 and 25. An enclosed pressure chamber 23 is defined by running surfaces 26 and 27, radial surface 28 of outer cover 21', and surface 29 of the annular piston 20'. The pressure chamber 23 is connected by means of a pressure pipe 30 having suitable control valving to a source of a pressure medium (not shown). Compression springs 34 accommodated and guided in opposing bores 32, 33 in the clamping cheeks 21 and the annular piston 20', respectively oppose the pressure prevailing in the pressure chamber 23.

The mechanism operates as follows:

During the weaving process the bore 8 in the main shaft 2 is connected via a pipe (not shown) and a valve system (not shown) controlled by detectors of troubles of the machine, to the source of pressure medium. The pressure chamber 10 thereby comes under pressure and presses the pressure-piece 3 to a first position against the endface of the coupling housing, flange portion 1 remote from the pressure chamber. The driving disk 18 is thereby clamped in and the belt pulley is connected firmly in rotation to the coupling housing. If a disturbance occurs in the weaving process, the valve system brings about rapid emptying of the pressure chamber 10, whereupon the compression springs 12 slide the pressure-piece 3 towards the other flange portion 1' of the coupling housing and into a second position.

The driving disk 18 is thereby released and the brake disk 19 in turn, is clamped by the pressure-piece 3 and the inner front face of the flange portion 1'. The control valving in the pressure pipe 30 (not shown) disconnects the pressure chamber 23, which has maintained cheeks 20, 21 in spaced position, with the source of pressure medium. Hence the cheeks 20, 21 standing move toward each other under the action of the compression springs 34 to clamp the brake disk 19 at its outer section. By the simultaneous clamping of the brake disk 19 at its outer section, (brake disk linings 17' clamped by means of the clamping cheeks 20,21 which are fixed against rotation on the machine frame) and at its inner section (brake disk linings 17' clamped by the coupling housing flange portion 1' and the pressure-piece 3), the coupling housing and consequently the main shaft are braked and brought to a standstill. If the main shaft 2 is now to be turned slowly by hand or by means of an auxiliary driving motor, the main driving motor being still running, valve means are operated to open the pipe 30 so as to establish connection between the source of pressure medium and the chamber 23, whereby the pressure chamber 23 between the radial surfaces 28 and 29 of clamping cheeks 20, 21 is put under pressure.

Piston 20 prime is moved against the face of spring 34 until faces 35, 36 remote from the pressure chamber 23 come to lie together thereby placing cheeks 20, 21 in their axially spaced position. The movement of piston 20' upon chamber 23 being pressurized is sufficient to allow slight sliding apart of the clamping cheeks 20, 21 to release the brake disk 19 at its outer diameter from the clamping cheeks, whereby the braking is removed and the machine becomes freely rotatable.

While a preferred embodiment of the invention has been described using specific terms, such description is for illustrative purposes only, and it is to be understood that changes and variations may be made without departing from the spirit or scope of the following claims.

What is claimed is:

1. Clutch-brake apparatus for the main shaft of a loom which includes a disconnectable friction coupling disposed between said main shaft and a driving motor, said apparatus comprising:
   brake means rigidly connected to a frame portion of said loom;
   a slidable pressure-piece having a first extreme position in which frictional engagement between the main shaft and the driving motor is effected;
   said pressure-piece having a second extreme position in which frictional engagement between the main shaft and said brake means is effected; and
   means operative to release said brake means without alteration of said second position of said pressure-piece.

2. The apparatus of claim 1 wherein said brake means includes a brake disk separate from said pressure-piece and a clamping mechanism for releasably engaging a region of said brake disk when said pressure-piece is in said second position.

3. The apparatus of claim 2 wherein said brake disk is coated in said engagement regions with brake linings.

4. The apparatus of claim 2 wherein said clamping mechanism includes clamping cheeks acted upon in a clamping direction by compression springs and in a release direction by a pressure medium.

5. The apparatus of claim 4 including a pressure chamber enclosed by said clamping cheeks which receives said pressure medium for releasing said brake disk and in which said pressure medium is vented for actuation of said brake disk.

* * * * *